3,537,922
COMPOSITE PROPELLANT COMPOSITIONS CONTAINING DISSOLVED LITHIUM PERCHLORATE IN THE POLYMERIC BINDER
Lucius G. Gilman, Wakefield, and Robert I. Lait, Swampscott, Mass., assignors to Monsanto Research Corporation, St. Louis, Mo., a corporation of Delaware
No Drawing. Filed July 2, 1962, Ser. No. 207,464
Int. Cl. C06d 5/00
U.S. Cl. 149—19          15 Claims This invention relates to propellants, and more particularly, provides novel propellants based on solid solutions of lithium perchlorate in polymer and methods of making the same.

Conventional composite solid propellant compositions generally consist of an inorganic oxidant and a plastic binder, which also serves as the reductant-fuel of the system. The aforesaid system is a heterogeneous composition wherein the burning rate and stability to detonation are dependent to some extent upon the particle size of the oxidant. The former property is improved as the particle size of the oxidant is reduced, but milling to provide a finely divided oxidant is hazardous and periodic explosions are encountered.

Dissolving the oxidant in the binder provides the oxidane in a state of subdivision finer than any grinding can produce, and avoids the hazards of milling. What is more, it unexpectedly produces a pronounced decrease in the impact sensitivity of the binder-oxidant combination.

Putting the oxidant into the same phase as the binder also raises the available solids loading of the composition. There is a limit to the solids loading for a given amount of binder, above which not enough binder will be available to form a continuous phase binding the discontinuous solids phase into a unitary structure. In the conventional composite propellant, the solids phase includes oxidant for the binder. To the extent that the binder phase includes oxidant for itself, available solids loading is freed for inclusion of other energetic components.

Only a limited number of products have been known up to now which are polymeric solid solutions of lithium perchlorate, wherein the polymer and perchlorate are combined in the same homogeneous phase. These have each been products wherein the polymer is a condensation polymerized polyamide, wherein the polymer chain includes amide bonds as chain-linking units.

It is disadvantageous to be limited in the nature of useful polymeric binders. Important parameters such as energy value of a polymeric fuel vary depending on the polymer composition and structure.

Available methods for making the polymeric solid solution products have also been disadvantageously limited. For example, to prepare a polyamide solid solution, a polyamine has been condensed with a polycarboxylic acid to form a polymer, and then the perchlorate dissolved in the preformed polymer. This involves working with viscous molten polymer; but condensing the polyamine and polycarboxylic acid in the presence of the perchlorate has to be avoided because the condensation releases water, which keeps the perchlorate from dissolving.

Alternatively, the lithium perchlorate can be dissolved in a monomeric cyclic lactam such as caprolactam, and the monomer polymerized in the presence of the perchlorate. However, only a limited class of catalysts will effect this polymerization, and the temperatures required to polymerize caprolactam and other similar lactams are rather high, above about 100° C.

It is an object of this invention to provide improved solid propellant compositions, and methods of making the same.

A particular object of this invention is to provide improved solid propellant compositions wherein oxidant for the polymeric binder phase is supplied within the polymeric binder phase.

Another object is to supply a novel method of preparing propellant compositions, whereby propellant compositions are produced in which the binder includes polymer and oxidant for said polymer in the same homogeneous phase.

These and other objects will become evident from a consideration of the following specification and claims.

In accordance with this invention, polymeric solid solutions of lithium perchlorate in an olefin polymer, such as a vinyl polymer, comprise the continuous phase of a composite propellant composition.

S.N. 207,466 filed concurrently herewith by Lucius G. Gilman, et al., provides a convenient method of forming solid polymeric solutions of this perchlorate, by polymerizing an olefinic monomer containing an O, S or N donor atom in the presence of dissolved lithium perchlorate. It is found that the product is polymer containing dissolved lithium perchlorate, wherein the polymer and perchlorate are in the same homogeneous phase. This provides a solid polymeric composition loaded with inorganic solids wherein the solids are in the continuous phase, rather than existing in a discontinuous phase, held together in a coherent mass by the binder action of the polymer.

Certain vinyl polymers are known, such as polyvinyl alcohol and its acetals, which correspond to unstable vinyl monomers and therefore must be prepared indirectly, from the polymer of a stable monomer. Solid solutions of lithium perchlorate in this kind of vinylic polymer are also available, by a method comprising dissolving lithium perchlorate in a fluid mixture of such a polymer with a plasticizer, as set forth in copending application S.N. 207,469, filed concurrently herewith by Lucius G. Gilman.

The stated methods and products have now been found applicable to the preparation of propellant compositions. Thus, in accordance with this invention, it has now been found that in propellants of the composite type, including a continuous and a discontinuous phase, the continuous phase will advantageously comprise a polymeric solid solution of lithium perchlorate wherein the polymer and oxidant amounts of the perchlorate are combined in the same homogeneous phase, and the discontinuous phase comprises energy-rich solids.

The products of the present invention are especially advantageous because the polymers have structures differing from those of condensation polyamides. The result of differences in structure is a difference in specific energy, volume of gaseous combustion products and other factors of importance in tailoring propellant compositions to give maximum performance.

Preparation of these vinylic polymer compositions can be accomplished by the methods of either of the stated copending applications. Particularly advantageously, the products are prepared by the method employed in S.N. 207,466, wherein an olefinic monomer is polymerized in the presence of dissolved lithium perchlorate. The polymerization proceeds readily, at low temperatures, with a variety of catalysts, in the presence of energy-rich solids constituting the discontinuous phase in the ultimate product, to produce the finished propellant composition in a single step.

The propellant compositions provided in accordance with this invention will include an oxidant amount of lithium perchlorate in solid solution in a polymeric binder consisting essentially of a polymer of an olefinic monomer, said perchlorate and polymer being in the same homogeneous phase.

By solid solution is meant that the perchlorate and the polymer are homogeneously mixed and in the same phase, to the extent that heterogeneity therebetween is not evident on examination under an ocular microscope.

By a polymeric binder is meant a matrix comprising polymer having a molecular weight at least sufficient to make the polymer solid at room temperature. It is undesirable to have the molecular weight so high that the polymer is infusible and insoluble. Preferably, the product will be sufficiently elastomeric to have a tensile strength of at least 50 pounds per square inch (p.s.i.) and ultimate elongation (at break) of at least 20%.

The perchlorate must be anhydrous, containing less than about 0.5 mole-percent water, and in references to it, it is to be understood that anhydrous perchlorate is meant.

By an oxidant amount of the perchlorate is meant enough to supply the combustion oxidation requirements of a significant portion, which will be at least about half the oxidation requirements, of the polymer. Lithium perchlorate, $LiClO_4$, decomposes to LiCl and 2 moles of oxygen molecules per mole of perchlorate. Thus referring for example to oxidation of polymers including $CH_2$ and like hydrocarbon units, if the C atom forms CO and the hydrogen atoms form water, respectively, as gaseous oxidation products, the consumption of oxidant is 0.5 mole of lithium perchlorate per mole of methylene units so oxidized. Under certain conditions the hydrogen is not oxidized or is oxidized in part but a corresponding amount of a metal is. Thus the ratio of perchlorate to polymer to supply the oxidation requirements will be at least about 0.5 mole per mole of reduced carbon atoms in the polymer. To attain the benefits of this invention, at least half of this consumption requirement is supplied by dissolved lithium perchlorate in the same homogeneous phase as the polymer.

Preferably, all the oxygen requirement for oxidation of the polymer is supplied by dissolved lithium perchlorate. More than half and desirably all the oxygen requirement of the total composition may be supplied by this perchlorate.

The present compositions may consist essentially or entirely of the polymer and lithium perchlorate. Such compositions can be employed as such to produce propellant gases for rockets and the like by burning, or alternatively as explosives.

As will appear hereinafter, however, it is desirable to include other components in the composition, which may either be part of the same binder phase as the polymer, or part of the discontinuous solids phase combined with the binder. These may include fuels and oxidants, as further pointed out hereinafter. If these other compounds are fuels, they consume oxygen, and thus increase the total oxygen requirement of the composition. Where additional oxidant is included, the lithium perchlorate need not supply all the oxidant requirements of the composition, but to adapt the composition for propellant and fuel use, it is necessary that the composition include sufficient total oxidant to render combustion of the system self-supporting.

The quantity of lithium perchlorate desired in the final solid propellant composition will thus vary depending on the particular selection of ingredients. It may be up to about 80% of lithium perchlorate based on the total weight of the composition. It will be understood that substantially smaller amounts of the perchlorate may be employed in effective compositions, and the amounts are often in the region of about 4 or 5 to 15 or 16%.

The polymers in the products of the invention are polymers of olefins, produced by addition polymerization of carbon-to-carbon unsaturation. The useful olefins are characterized by a substituent on one of the said unsaturated carbon atoms which is a group containing a donor atom selected from O, S and N. Preferably these are vinylic olefins, in which a single such group is substituted on a hydrocarbon olefin carbon atom, such as

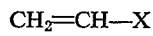
$$CH_2=CH-X$$

where X is the group containing the donor atom.

Donor atoms are atoms having a free electron pair, and it is thought that solvent power for the perchlorate has some connection with ability to coordinate with the lithium cation. In any case, hydrocarbon polymers do not appear to dissolve the lithium perchlorate to any significant extent.

In a preferred embodiment of the invention, the vinyl polymers employed are prepared from an olefin in which the sole non-hydrocarbon configuration is a side-chain carbonamide group, thus producing a hydrocarbon polymer chain with repeating carbonamide side groups. For example, they may be polymers of acrylamide, of C-alkylated acrylamides such as methacrylamide, or of N-alkylated and C- and N-alkylated acrylamides such as N-methylacrylamide, N-tert-butylacrylamide, N-tert-octylacrylamide, N,N-dimethylacrylamide, N,N-dipropylacrylamide, N-octylmethacrylamide, N-decylmethacrylamide and the like.

They also may be polymers of cyclic amides including polymerizable olefinic unsaturation, the polymers of which are formed by addition polymerization, such as 1-vinyl-2-pyrrolidinone, 3 - methyl-1-vinyl-2-pyrrolidinone, and the like.

They also may be polymers of other olefinic amides, such as 3-butenoic amide.

Still another group of polymers which may form the polymeric component of the present novel products are those made by addition polymerization of an olefinic amide having in a side chain a further substituent including a hetero atom (polyvalent) atom other than C) selected from the group consisting of O, S and N. References herein to "an" acrylamide are intended to include both those in which the only non-hydrocarbon component is the carbonamide side chain group and those including hetero atoms of the type just stated. Illustrative of such amides are, for example, oxy compounds including hydroxy amides such as N-methylacrylamide, N-(2-hydroxyethyl)-acrylamide, 2-methylolacrylamide and the like and ether amides such as N-acrylylmorpholine, N-methacrylylmorpholine and N-(2-ethoxyethyl)acrylamide and so forth. The S-containing amides may be illustrated by N-(mercaptomethyl)acrylamide, 2-(2-ethylthioethyl) acrylamide and N-(tetrahydrothienyl)acrylamide. Illustrative of the N-containing amides are acrylic hydrazide, N-acrylylpiperazine, 2-(aminomethyl)-acrylamide, 1-cyanoacrylamide, N-(trinitroethyl)acrylamide and the like.

Referring now to the polymers in products of this invention which are free of carbonamide bonds, those containing O are illustrated first by ethers. Thus, they may be polymers of olefinic ethers such as 1-mehtoxybutadiene. Another class of O-containing polymers included herein are polymers containing OH groups such as polymers of allyl alcohol. The polymer may be derived from an olefin containing both O and OH such as vinyloxyethanol. Analogous sulfur compounds such as vinyl methyl sulfide may also be used in this connection.

Another group containing O which may characterize presently useful polymers is oxo, rather than the oxy groups shown above. For example, this may be keto, as in methyl vinyl ketone.

Even more desirably, it will be a carboxylate group such as an ester group. Useful esters include as a first class the polymers of olefinic esters. Either the alcohol or the acid portion may be the olefinic group. Illustrative esters include those in which the acid portion of the molecule is unsaturated such as acrylates like methyl acrylate, tert-butyl acrylate, hexyl acrylate, and decyl acrylate, methacrylates such as methyl methacrylate, ethyl methacrylate, n-butyl methacrylate and the like. Illustrative of some ester in which the alcohol-derived portion of the molecule is unsaturated are allyl esters such as allyl acetate, and vinyl esters such as vinyl formate, vinyl acetate and vinyl stearate.

Referring to the N-containing polymers, those wherein N is amine nitrogen are illustrated by polymers of vinylpyridine. Acrylonitrile provides a polymer illustrating the type wherein the donor N atom is in a cyano group.

There is no objection to combining several characterizing groups in a single molecule providing the repeating unit in a polymer as contemplated hereby, and indeed, this may be particularly advantageous. For example, polymers of esters of O-containing alcohols may provide both oxy and oxo oxygen, such as 2-methoxyethyl acrylate, 2-methoxyethyl methacrylate, ethylene glycol dimethacrylate, the methacrylate ester of a polyethylene glycol containing, say, nine ethyleneoxy units, and so forth. Or the alcohol may contain amino N such as N,N-dimethylaminoethyl methacrylate and the like.

Mixtures of monomeric compounds such as those above mentioned may have solvent power for lithium perchlorate which is substantially greater than either of the compounds alone. Thus useful mixtuers of such vinyl monomers include for example acrylamide-2-methoxyethyl acrylate, acrylamide-vinyloxyethanol, acrylamide-acrylonitrile, acrylamide-allyl acetate, acrylamide-vinyl formate, and so forth. Generally, mixtures in the ratio of about 1:1 mole are found advantageous, but other proportions of the vinylic monomers may be employed if desired. It is to be understood that a copolymer is to be regarded as a polymer of a particular monomer if it contains enough of the monomer to confer characeristics of the homopolymer on the copolymer: for example, references to a polyacrylamide herein are intended to include copolymers in which at least 30 mole-percent of polymerized olefinic monomer is acrylamide.

Especially where the selected monomer is an N-alkylated acrylamide, which does not cross-link in polymerization as does acrylamide, it is sometimes advantageous to include a small proportion of a cross-linking monomer such as acrylamide or methylene diacrylamide in the mix. Proportions such as from 0.1 to 0.10 mole of the crosslinking monomer to 1.0 mole of the noncross-linking monomer are useful in this connection, to improve toughness and the like.

In preparing the presently provided novel propellant compositions, advantageously an olefinic monomer of the nature discussed above is polymerized in the presence of an oxidant amount of disolved lithium perchlorate.

Lithium percholrate is in itself an effective initiator of polymerization at 85° C. with vinyl monomers that normally undergo cationic polymerization, such as vinyl ethers, alpha-methylacrylamide, acrylamide, and vinyl formate. Copending application S.N. 28,818, filed May 13, 1960, by Russell B. Hodgdon, Jr., assigned to the same assignee as the present application, relates to the use of lithium percholrate as catalyst for polymerization of such monomers. It is to be appreciated, however, that mere catalytic amounts, such as 2–5% by weight of the total reaction mixture will not be sufficient to provide oxidant amounts of the perchlorate. It is indeed, not infrequently necessary to stir and heat the system comprising the olefinic monomer to put the desired oxidant amounts of the perchlorate into solution, though once in solution, the perchlorate generally stays in solution in the liquid even on discontinuance of the heating.

In systems comprising oxidant concentrations of lithium perchlorate as contemplated hereby, it may not be desirable to employ perchlorate as sole catalyst. An induction period of five to twenty minutes before polymerization starts is observed to occur with anhydrous lithium perchlorate using low catalytic concentrations of the perchlorate, giving time to pour and shape the mass, but the induction of the reaction is reduced drastically when a 1:1 molar ratio of lithium perchlorate to acrylamide is exceeded.

Various other components of the solution comprising the vinyl monomer and the lithium perchlorate can also affect its polymerization. For example, addition of a hydrazine salt to a solution of lithium perchlorate in acrylamide stops the reaction immediately and a low molecular weight polymer is obtained even when such powerful cationic catalysts are added as boron trifluoride etherate. However free radical polymerization occurs readily. Thus cumene hydroperoxide will cause the complete polymerization of acrylamide rapidly in the presence of an inhibitor. Other free radical initiators such as benzoyl peroxide also cause polymerization in the presence of inhibitors of cationic polymerization.

Another useful approach to effecting the polymerization, where a monomer polymerized by lithium perchlorate is employed to practice the method, is to include a polymerization inhibitor such as an amine in the reaction mixture, and after accomplishing solution of the lithium perchlorate in the monomer-containing mixture and thorough mixture of the components, quickly mix in a reagent which neutralizes the inhibitor, cast (or extrude) and allow polymerization to a solid to occur.

Other components present in the polymerization mix in addition to the dissolved lithium perchlorate, the olefinic monomer containing a donor atom selected from O, S and N, and also catalyst where the perchlorate is not itself the catalyst, may affect favorable conditions for polymerization, but in general, polymerization will be effected at temperatures ranging from 0° C. and below up to any temperature below decomposition temperatures of reaction mixture components. Where heating does not have to be avoided because of the presence of sensitive ingredients, it is usually desirable to heat the reaction mixture to promote fluidity of the mix and solubility of the perchlorate. An advantage of the present method is that it is usually possible to effect polymerization at conveniently rapid rates while staying at relatively low temperatures such as between 50° and 100° C.

Usually polymerization is effected simply by maintaining the monomer in contact with active catalyst at suitable temperatures. If desired, variation of pressure from atmospheric—for example, down to 0.1 mm. Hg, or up to 5000 p.s.i.—may be employed. Solvents and diluents, such as plasticizers and the like, discussed, in more detail below, may be present.

After polymerization is complete, it is sometimes advantageous to maintain the polymerized mass at temperatures above ambient temperature for a time, to effect cure or post-cure of the mass.

As disclosed in the above mentioned application S.N. 207,466, relating to solid solutions as employed in the present propellant composition, additional components will desirably be combined with the olefinic monomer and the perchlorate in preparing the solid solution phase of the present compositions. Components which are particularly desirably present in such compositions comprise polymer-modifying additives such as plasticizers, and in this connection it has been found that unexpectedly large increases in solvent power for lithium perchlorate can be achieved by selection of appropriate plasticizers.

Additives which can advantageously be incorporated in the compositions of this invention comprising homogeneous mixtures of polymer and lithium perchlorate are the relatively low molecular weight plasticizers. One exemplary class of these are amides. These include, for example, the sulfonamides such as N-monosubstituted toluene sulfonamides such as N-ethyl-p-toluenesulfonamide, N-ethyl-o-toluenesulfonamide, and mixtures thereof. Further it includes amides and hydrazides such as formamide, dimethylformamide, hydrazodicarbonamide and oxaldihydrazide.

Another group of useful plasticizers are glycols and glycol ethers such as triethyleneglycol dimethyl ether, ethylene glycol, glycerol and the like. In this group, ethylene glycol is found to exert a particularly favorable effect, used both alone and in combination with other plasticizers in the binder compositions.

Another class of presently useful plasticizers are those which are better fuels than the ethylene glycol type. Such plasticizers having good fuel properties are characterized by the presence of nitro groups. Illustrative of such compounds are 5,5-dinitro-1,2-hexanediol, bis(2,2-dinitropropyl)formal, 5,5-dinitro-1,3-dioxane, tris(hydroxymethyl) nitro methane, and the like.

The fairly polar plasticizers preferably should also be solvents for the lithium perchlorate such that components of the system are mutually soluble or dispersible to effect a homogeneous solid composition. The presence of the plasticizers may render the composition more rubbery and provide a material improvement in tensile elongation of the material.

The plasticizer employed will function as a fuel element in the composite solid propellant, and the ratio of lithium perchlorate should be adjusted so that a proper balance is maintained between the oxident and the fuel combinations to provide complete combustion.

The amount of plasticizer employed can vary up to about 35 weight percent of the polymer present in the composition but amounts of from about 15 to about 25 weight percent are generally preferred.

In preparing the presently provided propellant compositions based on polyvinyl alcohol and acetal polymers, preformed polymers are employed. As is known in the art, the polyvinyl alcohol and the acetals thereof are prepared by polymerizing a vinyl ester such as vinylacetate, hydrolyzing the resulting polymer and thereby forming a polyvinyl alcohol, and treating this polyvinyl alcohol with an aldehyde to form the acetal of the alcohol. Properties of the polymers may vary depending on the extent of the initial hydrolytic removal of the acid esterifying groups (acetate), the extent of acetalization of the resulting hydroxy groups, and also on factors such as the molecular weight of the polymer. In general, for utility in connection with the present invention, the polyvinyl ester should be hydrolyzed to an esterified OH content of below about 10%. The remaining portion of the molecule may comprise entirely vinyl alcohol units with free OH groups. Polyvinyl alcohol is useful in self for the present invention. Alternatively, any percentage of the alcohol groups for hydrolysis of the esterified groups may be acetalized. The acetalizing agent can be any of a variety of aldehydes. Preferably, this will keep a simpler lower aliphatic aldehyde, in which a saturated hydrogen radical is attached to the carboxyl aldehyde group. Thus for example, useful aldehydes for the acetalization of the polyvinyl alcohol include formaldehyde, acetaldehyde, propionaldehyde, n - butyraldehyde, valeraldehyde and the like.

To provide the propellant compositions from the preformed polymers, they will be combined with a plasticizer. By a plasticizer is meant a fluid material compatible with the polymeric component and which softens the polymeric material. A variety of alcohols and esters are effective plasticizers toward polyvinyl alcohol and its acetals, and may be employed in this connection. Thus for example, specific useful hydroxylic plasticizers are ethylene glycol, trimethylene glycol, 1,6-hexane diol, 1,2-hexane-diol glycerol, pentaerythritol, and the like. Derivatives of alcohols which may be used as plasticizers include materials such as bis-propylformal, 1,3-dioxane, the monomethyl ether of diethylene glycol, the dimethyl ether of diethylene glycol, and so forth. Further, the useful plasticizers in the present connection include esters, particularly aryl polyfunctional acid esters, such as dialkyl phthalates like di-n-butyl phthalate, phosphate esters like tricresyl phosphate, and so forth.

The amount of plasticizer to be employed in connection with a polyvinyl alcohol or acetal will vary depending on the specific polymer and specific plasticizer being employed, and the extent of solubility of lithium perchlorate which it is desired to achieve. Usually at least one part of plasticizer per ten parts by weight of polymer will be desirable. To avoid producing a mass which will be fluid at room temperature, it is usually desirable to remain below a portion of ten parts of plasticizer to one of polymer, and indeed, usually less plasticizer than polymer, by weight, will be preferred.

The procedure for forming the continuous phase of the present propellants comprises heating lithium perchlorate, in oxident amounts as set forth above, with a mixture of the polymer and plasticizer to effect solution thereof. The temperature to which the mix should be heated should be at least sufficient to form a melt. The temperature employed should be, of course, below the decomposition temperature of the reaction mixture components. For example, temperatures in the range of between 50 and 200° C. are generally suitable. Usually stirring at the elevated temperature is required to put the lithium perchlorate into solution, after which the melt may be cooled back to room temperature to provide the solid solution product of the present invention, wherein lithium perchlorate is in the same homogeneous phase as a polymeric binder comprising a plasticizer and a polymer selected from the class consisting of polyvinyl alcohol and acetals of polyvinyl alcohol.

The solid solutions of hereinabove-identified applications S.N. 207,466 and S.N. 207,469 may be used as propellants, when they contain sufficient dissolved perchlorate to render their combustion self-supporting. More effectively, however, the method of this invention for propelling rockets will be conducted employing the compositions of this invention, characterized by the inclusion of a third, energy-rich component as a discontinuous phase.

By an energy-rich component is meant a component in addition to the polymeric binder, and which supplies more energy in combustion of the propellant composition than combustion of the polymeric binder. This may be a thermal fuel, such as metals like aluminum, or it may be an explosive, such as an azide or an explosive oxidant such as ammonium perchlorate, and so forth, or it may be a mixture of both.

The stated third energy-rich component will at least in part constitute the discontinuous phase in a propellant composition wherein the continuous phase is the solid solution of lithium perchlorate in an olefinic polymer. It may be present in amounts as high as the binding power of the solid solution permits. At the minimum, it will be present in an amount sufficient to raise the specific impulse of the composition significantly above that of the solid solution alone. In general, the amount thereof will range between about 50 and about 95 weight percent of the total composition.

Thus, the novel homogeneous, single-phase combinations of lithium perchlorate with polymers provided by this invention can advantageously contain fuels which are advantageous in energy but may produce little or no gas. For example, the propellant compositions may contain finely divided light metals and various hydrides thereof. Examples of these are beryllium, boron, magnesium, aluminum, magnesium hydride, aluminum hydride, the various solid hydrides, such as decaborane, alkylated decarboranes (ethyl alkylated decaborane), aluminum borohydride, lithium aluminum hydride, and the like. For example, the homogeneous mixture of lithium perchlorate and the polymer may contain up to about 20% by weight of the total composition of atomized aluminum (particle size about 20 microns). Preferably the aforesaid fuel material should be sufficiently fine to all pass a standard 100 mesh screen, and more preferably should pass a 200 mesh screen.

These light metal and hydride high energy additives should preferably not exceed about 25 weight percent of the total composition, since the heavy combustion exhaust tends to lower performance of the solid propellant composition. It is often desirable to incorporate not more than from 5 to about 10 weight percent of said additives based on the total weight of the propellant composition.

Another group of additives which may be included in the system as part of the solids phase comprises oxidants, and other readily decomposable materials such as explosives. Illustrative of useful oxidants are, for example, ammonium perchlorate, ammonium nitrate and the like. Illustrative of useful explosive components are, for example, sodium azide and RDX (cyclotrimethylenetrinitramine).

The amount of oxidant employed in the solids phase will be adjusted in accordance with the amount of fuel to be burned in the composition and the amount of dissolved oxidant already supplied by the binder. Energetic, gas-supplying decomposable materials not requiring oxidant will usually be employed in gas-deficient systems, and the amount thereof adjusted to supply gas volume sufficient to take up thermal energy available so as to maximize the specific impulse of the system.

Referring to use of the presently provided compositions, when these are polymerization cast directly in a rocket motor, they will generally exhibit adhesive properties, and thereby adhere in polymerization to the cylinder in which they are cast. Due to this adhesive quality, it may be desirable for a core insert to be employed to provide the desired internal cavity to effect proper radial burning of the propellant composition. This may be fabricated from or coated with a material such as polyethylene or polytetrafluoroethylene in order to provide ready release of the insert when polymerization is terminated.

The solid propellant may also be produced by extrusion for insertion in small bore rocket cases. In this case, a small amount of catalyzed liquid polymer composition can first be added to the cylinder case such that the insertion of the extruded mass will displace the liquid polymer, forcing it to rise in the annular space between the extrusion mass and the cylinder wall, whereby the inserted mass is securely bonded within the case. This liquid polymer can be of similar composition to the propellant composition insert, or any other suitable polymer composition which can be readily cured at suitable temperatures, below about 200° C., such as, for example, epoxy resins, polysulfide rubbers and the like.

The lithium perchlorate polymeric compositions of this invention burn vigorously and relatively uniformly when ignited and are useful as a solid propellant for rockets including short range ballistic weapons such as aircraft and artillery rockets and long range strategic missiles, wherein they may be the sole propellant or be employed in one or more stage of a multi-stage rocket system. The aforesaid compositions are also useful for rocket assisted takeoff, as boosters, sustainers and as pyrotechnics. When confined the aforesaid compositions also are particularly valuable as explosives.

The invention is illustrated but not limited by the following examples, in which all parts are by weight unless otherwise noted.

EXAMPLE 1

Mixtures of acrylamide and ethylene glycol are made up in which the ratio by weight is respectively (1) 15:10; (2) 17:8; (3) 19:6. Each of these mixtures will dissolve approximately 50 parts by weight of lithium perchlorate.

For the purpose of preparing compositions from the stated mixtures containing acrylamide, ethylene glycol and lithium perchlorate, about one part of N-methylmorpholine is added to each mixture as an inhibitor, to prevent polymerization of acrylamide catalyzed by the lithium perchlorate. Approximately 25 parts of aluminum (5 micron particle size) are added to each mixture, and the mixtures are stirred vigorously for about 1 hour at 85° C. The mixtures are then brought down to about 70° C. and succinic anhydride is added to neutralize the N-methylmorpholine. The temperatures of the mixtures are then again raised to 85° C. Cure to a coherent solid product is effected in about one hour at this temperature. After a one hour cure, the properties of the three samples at 73° F. are as follows:

| | Ultimate tensile strength, p.s.i. | Ultimate tensile elongation, percent | Modulus p.s.i. (2% secant) |
|---|---|---|---|
| Propellant: | | | |
| A-7-a | 17 | 474 | 92 |
| A-7-b | 118 | 715 | 230 |
| A-7-c | 325 | 590 | 420 |

Cure times longer than 1 hour will alter the physical properties: for example, for composition (3), lowering the tensile, strength to 271 p.s.i., but raising the elongation to 206%. Sample (3) has elastomeric properties and recovers almost completely from elongation up to about 90% of the ultimate.

The cured product identified as sample (3) is well adapted for use as a propellant. Its computed specific impulse is 246 lb.-sec./lb. The five second autoignition temperature is 412° C. and the strand burning rate is 1.34 inches/sec. at 1000 p.s.i. The impact sensitivity, 50% probability with a 2 kilogram weight in the standard Bureau of Mines drop impact tester, is 51 centimeters and the minimum height for detonation is 22 centimeters.

EXAMPLE 2

A mixture having solvent power for lithium perchlorate is prepared by combining 35 parts of acrylamide, 90 parts of ethylene glycol and 100 parts of N,N-diethylacrylamide. This mixture is combined with 530 parts of lithium perchlorate and about 250 parts of aluminum. Polymerization to a cured product is effected as described above. The cured product has a tensile strength of 829 p.s.i., elongation of 351% and a modulus of 47 p.s.i.

Similar results are obtained when methylene bisacrylamide is substituted for the acrylamide as a crosslinking agent for the dialkylated acrylamide polymer.

EXAMPLE 3

This example illustrates a preparation of a partially solid solution propellant with good mechanical properties at a low organic level.

A mixture of 8 parts by weight of acrylamide and 7 parts by weight of ethylene glycol is prepared and found to dissolve 14 parts of lithium perchlorate. This solution is combined with 48 parts of ammonium perchlorate and 22 parts of 5 micron particle size aluminum, and the mixture is cured as described above.

At room temperature, the lithium perchlorate is not completely dissolved, but complete lithium perchlorate solubility is achieved at temperatures below 85° C., the curing temperature. The cured composition has properties adapting it for use as a rocket propellant: It has a density of 1.912 grams/cc., and a computed specific impulse of 225 lb. sec./lb. Its physical properties are satisfactory; 108 p.s.i. tensile strength, 73% elongation and a modulus of 1328 p.s.i. The strand burning rate is 0.65 inch/sec. at 1000 p.s.i. The impact sensitivity (50% probability 2 kilogram weight in a standard Bureau of Mines drop impact tester) is 49 centimeters.

EXAMPLE 4

By mixing the acrylamide monomer with the other ingredients and adding ammonium persulfate to catalyze polymerization, a propellant composition as follows is prepared:

| | Percent by weight |
|---|---|
| Polyacrylamide | 5 |
| Formamide | 5 |
| Lithium perchlorate | 15 |
| Ammonium perchlorate | 10 |
| RDX | 43 |
| Aluminum | 22 |

This composition is readily mixed and cast because the lithium perchlorate dissolves in the mixture of acrylamide and formamide, resulting in 25% liquid even though there is only 10% organic material. The cured propellant has good mechanical properties because the lithium perchlorate remains dissolved in the organic material even after curing, thus providing 25% binder even though there is only 10% combined polymer and plasticizer. The maximum temperature rise during cure of the propellant shown above is about 70–75° F. under adiabatic conditions. Since the propellant cure is started at 85° F., the maximum attainable temperature is 155–160° F., well below the ignition temperature of the propellant

EXAMPLE 5

Propellants with excellent low temperature mechanical properties have been prepared by copolymerizing acrylonitrile and acrylamide, using ammonium persulfate as the catalyst, in a propellant mix, as exemplified by a propellant with the following composition and characteristics:

| | Percent by weight |
|---|---|
| Polyacrylamide | 4.0 |
| Polyacrylonitrile | 4.0 |
| Ethylene glycol | 7.0 |
| Lithium perchlorate | 12.0 |
| Ammonium perchlorate | 50.0 |
| Aluminum ($5\mu$ particle size) | 22.0 |

| Temperature, °C.: | Ultimate tensile strength, p.s.i. | Ultimate tensile elongation, percent | Modulus p.s.i. (2% secant) |
|---|---|---|---|
| −40 | 500 | 22 | 560–2,800 |
| −25 | 215 | 40 | 700–2,150 |
| +23 | 64 | 54 | 20–40 |
| +23 | 58 | 50 | 175 |

EXAMPLE 6

Propellants are prepared in which the polymeric binder is a plasticized homopolymer of acrylonitrile, using either benzoyl peroxide or ammonium persulfate as the polymerization catalyst. The compositions are castable at down to an 8% organic level; ease of casting is maximized when the ammonium perchlorate content is 70% $125\mu$ and 30% $50\mu$ average particle size. The composition of a typical formulation is as follows:

| | Percent by weight |
|---|---|
| Polyacrylonitrile | 5.7 |
| Ethylene glycol | 4.6 |
| Lithium perchlorate | 15.5 |
| Ammonium perchlorate | 55.2 |
| Aluminum ($5\mu$ particle size) | 19.0 |

The strand burning rate of this composition is about 0.55 in./sec. at 1000 p.s.i.

EXAMPLE 7

A polyvinyl butyral polymer is provided which has a hydroxy equivalent as polyvinyl alcohol of 17.5–21%, acetate equivalent as polyvinyl acetate, 2.5% maximum, remainder polyvinyl butyral. It has a viscosity of about 60 centipoises in a 6% by weight solution in methanol at 20° C.

A mixture is prepared at 190° C. of 16 parts of the stated polyvinyl butyral, 4 parts of di-n-butyl phthalate and 4 parts of diethylene glycol. This melt dissolves better than 40 parts of lithium perchlorate at 190° C. When the melt is cooled in Dry Ice, it provides a slightly gummy polymeric solution of lithium perchlorate.

Repeating the foregoing procedure but including additionally 20 parts of atomized aluminum produces a propellant composition which is flexible and rubbery.

Similar results are obtained by combining 15 parts polyvinyl alcohol, 15 parts ethylene glycol, 65 parts lithium perchlorate and 30 parts aluminum powder at 170° C.

While the invention has been illustrated with reference to the various specific embodiments thereof it is to be appreciated that modifications and variations can be made without departing from the scope of the invention, which is limited only as defined in the appended claims.

What is claimed is:

1. A composite solid propellant in which the discontinuous phase comprises energy-rich solids and the continuous phase is a solid solution of the polymer of an olefin containing a donor atom selected from the class consisting of O, S and N and an oxidant amount of lithium perchlorate in the same homogeneous phase.

2. The product of claim 1 wherein said polymer is a polymer of an acrylamide.

3. The product of claim 2 wherein said homogeneous phase includes a plasticizer for said polymer which has solvent power for lithium perchlorate.

4. The product of claim 3 wherein said plasticizer is ethylene glycol.

5. The propellant composition of claim 1, said composition including at least sufficient oxidant to make combustion of said system self-supporting.

6. The product of claim 4 said composition including at least sufficient oxidant to make combustion of said system self-supporting.

7. The product of claim 4 wherein substantially the total oxidation requirements of said system are supplied by dissolved lithium perchlorate.

8. The product of claim 1 wherein said polymer is selected from the class of polymers prepared by way of hydrolysis of a polyvinyl ester, consisting of polyvinyl alcohol and polyvinyl acetals, said continuous phase additionally including a plasticizer for said polymer.

9. The method of providing a composite solid propellant which comprises combining an olefinic monomer containing a donor atom selected from the class consisting of O, S and N with insoluble energy-rich solids and an oxidant amount of dissolved lithium perchlorate, and polymerizing said monomer to a polymer.

10. The method of producing the product of claim 2 which comprises combining an acrylamide with insoluble energy-rich solids and an oxidant amount of dissolved lithium perchlorate and polymerizing said acrylamide to provide a composite solid propellant.

11. The method of claim 10 wherein said olefinic monomer is combined with insoluble energy-rich solids, an oxidant amount of dissolved lithium perchlorate, and a plasticizer for the polymer of said olefinic monomer, said plasticizer having solvent power for lithium perchlorate.

12. The method of claim 11 wherein said plasticizer is ethylene glycol.

13. The method of claim 12 wherein substantially the total oxidation requirements of said system are supplied by dissolved lithium perchlorate.

14. The method of providing propellant power which comprises the combustion of a solid solution of an oxidant amount of dissolved lithium perchlorate and the polymer of an olefin containing a donor atom selected from the class consisting of O, S and N in the same homogeneous phase.

15. The method of claim 14 wherein said solid solution is the continuous phase of a composite solid propellant composition including energy-rich solids as a discontinuous phase.

References Cited

UNITED STATES PATENTS

| | | | |
|---|---|---|---|
| 3,054,702 | 9/1962 | Stengel et al. | 149—19 |
| 3,070,470 | 12/1962 | Argabright et al. | 149—19 |
| 3,000,713 | 9/1961 | Gold | 149—19 |
| 3,031,289 | 4/1962 | Philipson | 149—19 |
| 3,094,444 | 6/1963 | Hedrick et al. | 149—83 XR |
| 3,107,185 | 10/1963 | Hedrick et al. | 149—19 XR |
| 3,117,898 | 1/1964 | Hedrick et al. | 149—19 |

BENJAMIN R. PADGETT, Primary Examiner

U.S. Cl. X.R.

60—219; 149—20, 44, 83